United States Patent [19]
Cauquil et al.

[11] Patent Number: 5,523,514
[45] Date of Patent: Jun. 4, 1996

[54] PROCESS FOR DISSOLVING PLUTONIUM AND/OR OTHER RADIOACTIVE ELEMENTS PRESENT IN SOLID OR LIQUID PRODUCTS

[75] Inventors: Gérard Cauquil, Codolet; Michel Sourrouille, Laudun, both of France

[73] Assignee: Compagnie Generale des Matieres Nucleaires - Cogema, Velizy Villacoublay, France

[21] Appl. No.: 46,613

[22] Filed: Apr. 13, 1993

[30] Foreign Application Priority Data

Apr. 23, 1992 [FR] France .................... 92 05013

[51] Int. Cl.$^6$ .................................. G21F 9/00
[52] U.S. Cl. .................... 588/20; 588/1; 204/157.43; 210/682; 976/DIG. 380; 976/DIG. 392; 423/20
[58] Field of Search ............... 588/1, 20; 423/20; 204/157.43; 976/DIG. 393, DIG. 384, DIG. 380, DIG. 392; 210/682

[56] References Cited

U.S. PATENT DOCUMENTS

| | | | |
|---|---|---|---|
| 3,629,135 | 12/1971 | Wilding | 588/1 |
| 3,669,631 | 6/1972 | Dietrich et al. | 423/20 |
| 3,778,497 | 12/1973 | Deaton et al. | 423/2 |
| 3,957,676 | 5/1976 | Cooley et al. | 588/18 |
| 4,439,402 | 3/1984 | Tarutani et al. | 422/159 |
| 5,154,899 | 10/1992 | Sturcken | 423/20 |

FOREIGN PATENT DOCUMENTS

| | | |
|---|---|---|
| 2496324 | 6/1982 | France . |
| 2182482 | 9/1986 | United Kingdom . |

OTHER PUBLICATIONS

Chemical Abstracts, vol. 100, No. 8, Mar., 1984, Columbus, Ohio, US; Abstract No. 58602x, "Thermal Denitration Apparatus for Metal Nitrates", p. 444, col. 2 & JP-A-58 135 108 (Power Reactor and Nuclear Fuel Development Corp.) 11 Aug. 1983.

Chemical Abstracts, vol. 95, No. 11, Nov., 1981, Columbus, Ohio, US; Abstract No. 194213, "Apparatus for Metal Nitrate Decomposition During Reactor Fuel Processing" & JP-A-81 54 231 (Tokyo Shibaura Electric Co.) 14 Apr. 1981.

*Primary Examiner*—Ngoclan Mai
*Attorney, Agent, or Firm*—Pearne, Gordon, McCoy & Granger

[57] ABSTRACT

The invention relates to the dissolving of plutonium and/or other radioactive elements in an aqueous solution by microwave heating.

According to the invention, solid or liquid products containing plutonium and/or other radioactive elements are introduced into a container (7) containing an acid solution, comprising hydrofluoric acid and nitric solution, followed by the microwave heating of the solution containing these products using a chamber or tank (5) placed in a tight enclosure (1), which is supplied with microwaves by means of a coaxial cable or a waveguide (11) connected to the generator (9) located outside the enclosure.

The solid products can be plutonium dioxide $PuO_2$ or organic or mineral radioactive waste materials such as gloves, cellulose products, ion exchange resins, etc. The liquid products can be contaminated organic solvents such as tributyl phosphate in dodecane.

3 Claims, 2 Drawing Sheets

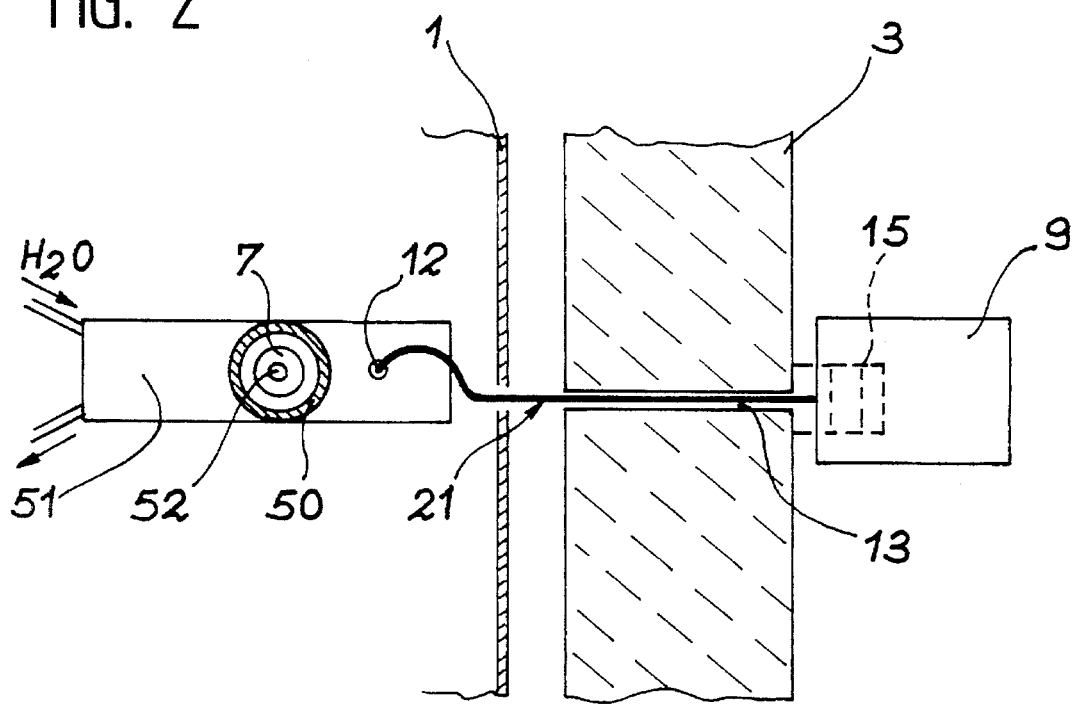
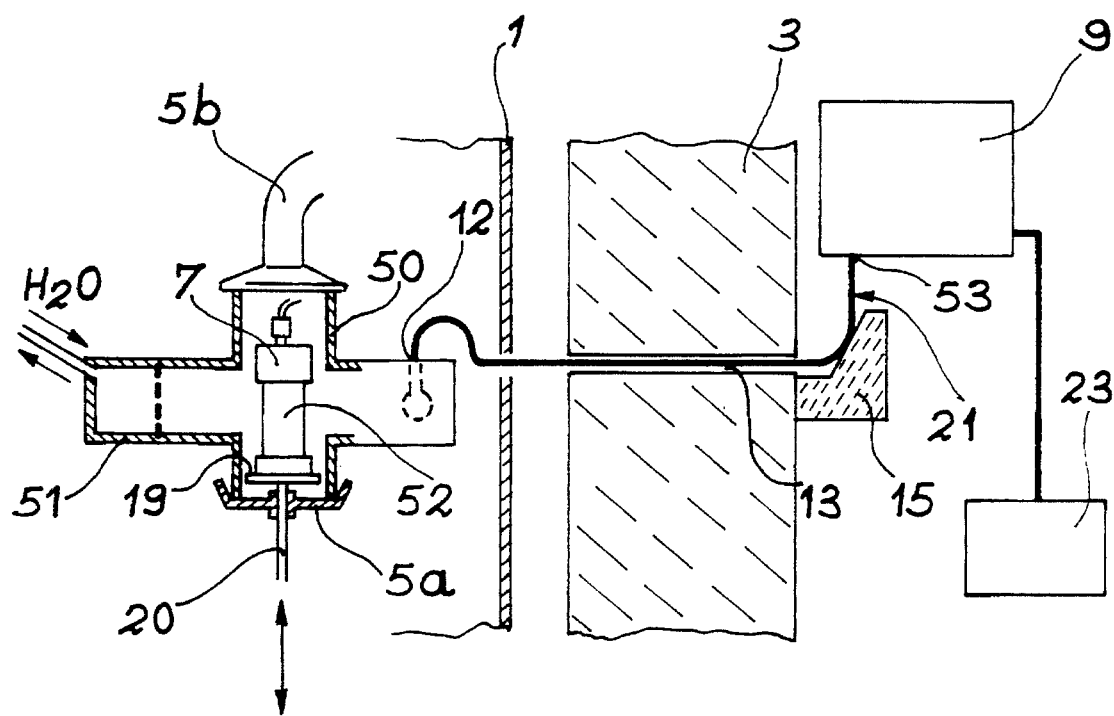

PROCESS FOR DISSOLVING PLUTONIUM AND/OR OTHER RADIOACTIVE ELEMENTS PRESENT IN SOLID OR LIQUID PRODUCTS

DESCRIPTION

The present invention relates to a process for dissolving plutonium and/or radioactive elements present in solid or liquid products more particularly usable for dissolving plutonium or plutonium dioxide in an aqueous solution and for treating plutonium-contaminated liquid or solid products.

It more particularly applies to the treatment of organic radioactive waste from nuclear installations, as well as the direct dissolving of plutonium and plutonium dioxide which are difficult to dissolve in an aqueous solution.

Among the presently known processes for dissolving in an aqueous solution the plutonium present in plutonium dioxide or in radioactive waste, EP-A-158 555, EP-A-160 589 and EP-A-297 738 describe processes based on the use of electrolytically regeneratable $Ag^{2+}$ ions for catalyzing the dissolving of plutonium in an acid solution.

Such processes are interesting, but they require the use of an electrochemical cell having a particular construction in order to bring about a rapid regeneration of the $Ag^{2+}$ ions necessary for dissolving purposes. Moreover, the dissolving solution is polluted by the $Ag^{2+}$ ions.

According to the present invention, it has been discovered that it was also possible to obtain good results for the treatment of radioactive waste materials without using $Ag^{2+}$ ions, but instead carrying out a microwave heating operation in order to mineralize the waste materials and bring about the dissolving of the plutonium.

For some years now microwave heating has been used in different fields. Thus, microwave heating equipment has been developed for analysis processes involving a wet mineralization stage, as described in FR-A-2 560 529 and FR-A-2 560 686. However, up to now, nobody has considered using this heating procedure for treating waste with a view to the decontamination thereof.

The present invention specifically relates to the use of a microwave mineralization method for the treatment of products containing plutonium and/or other radioactive elements with a view to dissolving the plutonium and/or said elements in an aqueous solution, which makes it possible in the case where the products are waste materials to limit the volume thereof, whilst improving the possibilities of recovering the plutonium present therein.

According to the invention, the process for the treatment of solid or liquid products containing plutonium and/or other radioactive elements comprises:

a) introducing the solid or liquid products into aqueous, acid solution and b) microwave heating the acid, aqueous solution containing these products to a temperature and for a time adequate for destroying the solid products and for dissolving the plutonium and/or radioactive elements in the aqueous solution, Generally, the acid, aqueous solution used is a solution incorporating at least one acid chosen from among nitric, sulphuric., hydrochloric, hydrobromic and hydrofluoric acid.

Preference is given to the use of a nitric acid solution, because the citric solution obtained at the end of the operation is compatible with the solutions presently treated in nuclear installations and in particular irradiated fuel reprocessing plants using the PUREX process. In addition, the plutonium can be recovered from these solutions using conventional methods.

In certain cases, it is possible to add to the acid, aqueous solution an oxidizing agent such as $H_2O_2$, a persulphate or a permanganate, e.g. $kMnO_4$, in order to improve the efficiency of the mineralization reaction.

In the process according to the invention, the choice of the acid used is more particularly dependent on the nature of the treated products.

According to the invention, the treated liquid or solid products can either be organic or mineral waste materials contaminated by plutonium, or metallic plutonium, or difficultly dissolvable plutonium dioxide, as is e.g. the case with the dissolving fines obtained during the dissolving of irradiated fuels.

In the process according to the invention, the use of microwave heating in particular makes it possible to bring about the dissolving of the plutonium using shorter times and less aggressive reagents than in the conventionally used processes.

Moreover, when the treated products are solid products such as organic waste, e.g. ion exchange resins, gloves, pockets, cottons and handkerchiefs, it is easy to bring about a complete destruction of the waste, which was not possible with conventional processes.

In the case where the solid products are organic waste materials, preference is given to an acid, aqueous solution constituted by a sulphuric or nitric acid solution. Nitric acid solutions are more particularly suitable in the case of polymer-based organic waste, such rubber or cellulose products e.g. cotton, KLEENEX, etc. Sulphuric acid solutions are preferred in the case of organic waste constituted by ion exchange resins and vinyl polymers.

When the treated products are liquid products, e.g. contaminated organic solvents such as tributyl phosphate in dodecane, it is possible to use an aqueous nitric acid solution.

When the product to be treated is plutonium or plutonium dioxide, preference is given to an aqueous solution of nitric acid and hydrofluoric acid, which catalyzes plutonium dissolving. As examples of appropriate aqueous solutions reference can be made to solutions containing 5 to 14 mole/l of nitric acid and 0.01 to 0.1 mole/l of hydrofluoric acid, such as the aqueous solution of 7 mole/l of $HNO_3$ and 0.05 mole/l of HF.

The invention also relates to an apparatus making it possible to carry out the microwave heating of such radioactive, liquid or solid products in a shielded enclosure or in a glove box.

This apparatus for the microwave heating of radioactive products comprises a tight enclosure provided with a biological protection wall, a chamber made from electricity conducting material placed in the enclosure and able to receive a container containing the product to be heated, a microwave generator located outside the enclosure, means for connecting the microwave generator to the chamber and for supplying the latter with microwaves passing through the enclosure and the biological protection wall of the enclosure by means of a passage opening and an alpha sealing means positioned level with said passage opening.

In this apparatus, the tight enclosure can be constituted by a glove box or a shielded enclosure, and the fitting of means for supplying the enclosure with microwaves from a generator located on the outside, makes it possible to adapt the microwave heating to the nuclear operating conditions and simplify the operation of the apparatus by facilitating access for an operator to the microwave heating control and regulating means.

According to a first embodiment of the apparatus according to the invention, the means for connecting the microwave generator to the chamber and for supplying the latter with microwaves are constituted by a waveguide, which traverses the biological protection wall of the enclosure by the passage opening and which has at least one bent portion between said passage opening and the microwave generator. The apparatus also comprises a biological protection wedge positioned behind the bent portion of the waveguide at the passage opening in order to ensure the continuity of the biological protection at said opening.

The waveguide used can have a square or rectangular section. Preferably, the section of said waveguide is as small as possible, e.g. less than 25 cm². Preferably, the waveguide has two portions each bent by 45°, which makes it possible to position a biological protection at the passage opening of the waveguide in the enclosure and to position the waveguide generator at 90° from the waveguide very close to the enclosure.

Advantageously, the chamber serving as a Faraday cage for focusing the microwaves has means for supporting the container containing the product to heated making it possible to regulate the height position of the container with respect to the chamber microwave supply.

According to a second embodiment of the apparatus according to the invention, the electricity conducting material chamber constitutes a waveguide and the means for connecting the waveguide generator to the chamber and for supplying the latter with microwaves are constituted by a coaxial cable traversing the biological protection wall of the enclosure by means of the passage opening. Advantageously, the coaxial cable is a semirigid cable having a small diameter, e.g. 6 mm. Through using a semi-rigid, small diameter coaxial cable, it is possible to form bends having a small radius of curvature, e.g. 50 mm, whilst leading to a significant simplification of the tight passages of the enclosure and the biological protection wall. Thus, the passage opening in the enclosure and in the biological protection wall also has a small diameter, e.g. 10 mm.

In addition, the presence of a biological protection wedge at the passage opening is not indispensable, as in the first embodiment of the apparatus.

However, when the coaxial cable has at least one bent portion between the passage opening and the microwave generator, a biological protection wedge can be located at said opening.

In the second embodiment of the apparatus according to the invention, the chamber constituted by the waveguide is preferably provided with an absorber making it possible to prevent a microwave return to the generator. This absorber can be constituted by a tight compartment of the chamber in which is circulated a cooling fluid such as water.

In this second embodiment of the apparatus according to the invention, the chamber serving as a waveguide has a reception cavity for the container containing the product to be heated. It can also have means for supporting the container in the cavity permitting a height regulation of the position of the container with respect to the microwave supply.

The coaxial cable has a total length which is a multiple of the wavelength $\lambda$ of the microwaves and the waveguide chamber is dimensioned in such a way that the distance between the centre of the cavity of the chamber for receiving the container and the end of the coaxial cable entering the chamber is a multiple of $\lambda/2$.

BRIEF DESCRIPTION OF THE DRAWINGS

The invention is described in greater detail hereinafter relative to non-limitative embodiments and with reference to the attached drawings, wherein show:

FIG. 2 In cross-section the second embodiment of the microwave heating apparatus according to the invention for performing the process of the invention.

FIG. 3 In vertical section the apparatus of FIG. 2.

FIG. 1 shows that the apparatus comprises a tight enclosure 1, such as a shielded enclosure or a glove box, provided with a biological protection wall 3, an electricity conducting material chamber or case 5 placed in the enclosure 1 and a container 7 containing the product to be heated located within the chamber 5.

Figure 1:
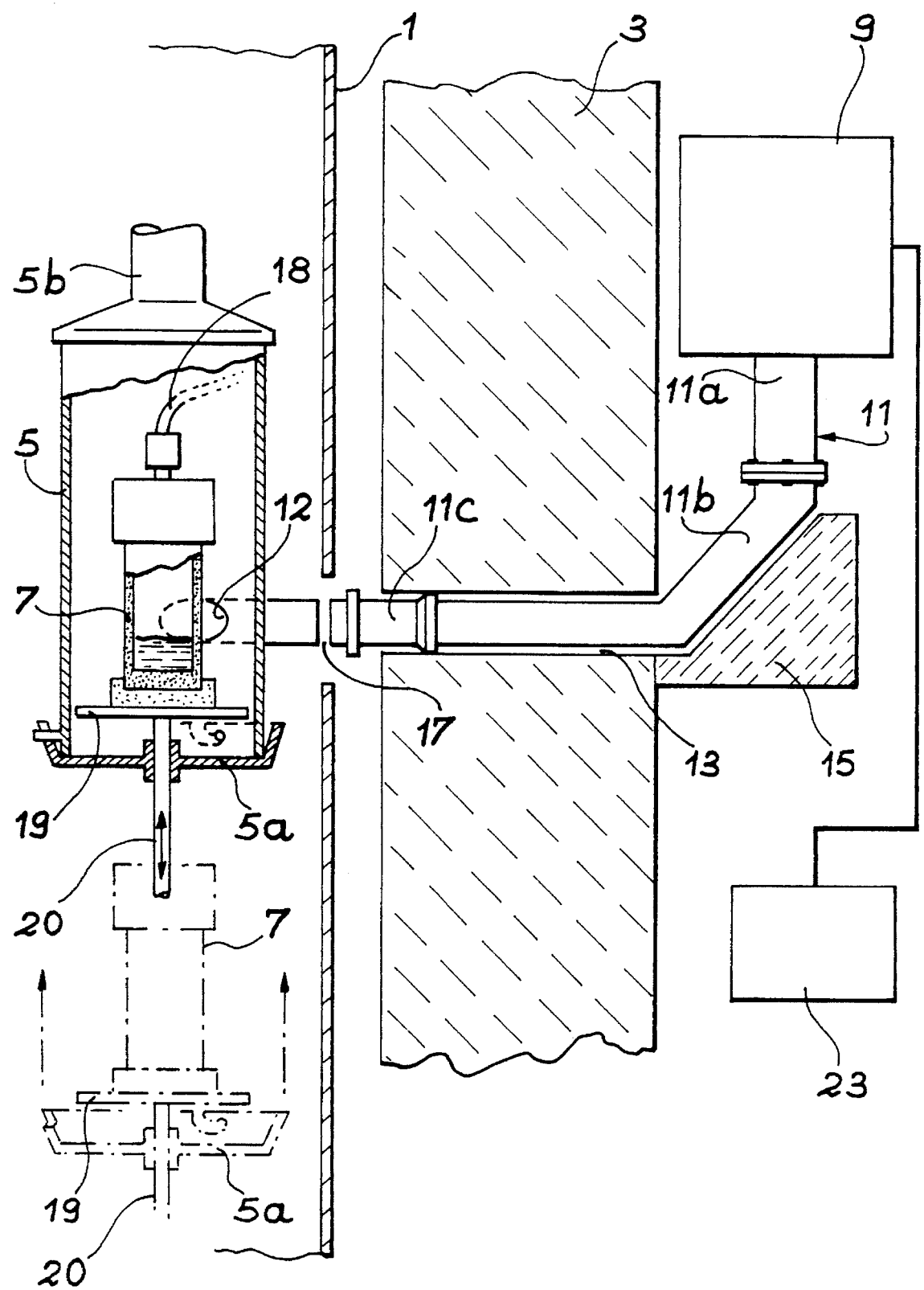
FIG. 1. A vertical sectional view of a microwave heating apparatus according to the first embodiment of the invention usable for performing the process according to the invention.

A microwave generator 19 is located outside the enclosure and is used for supplying microwaves to the chamber 5 via 8 waveguide 11, which traverses the enclosure biological protection wall 3 by means of an opening 13 and tangentially enters the chamber 5 at 12. It would also be possible to locate the microwave supply opening 13 on the axis, so as to direct the microwaves directly onto the axis of the chamber 5. This waveguide, in its portion outside the enclosure 1, is formed from three sections 11a, 11b and 11c, the section 11b having two segments bent by 45°, in order to place behind said section 11b at the passage opening 13 a biological protection wedge 15 ensuring the continuity of the biological protection at said opening 13.

The interest of producing the waveguide in three sections is to permit its use in enclosures not requiring a biological protection wall 3. Thus, under these conditions, it would be possible to eliminate the section 11b and directly fit the microwave generator 9 by means of the section 11a to the section 11c. At the enclosure 1, within the section 11c is provided a known alpha sealing means 17, e.g. a polytetrafluoroethylene membrane fitted on an O-ring.

The chamber 5 is provided with a detachable base 5a making it possible to introduce into it the container 7 for containing the product to be heated and is provided with a gas extraction duct 5b. This mobile base 5a is associated with a support 19 provided with a rod 20, which can slide in the base 5a with a view to regulating the height of the support 19 with respect to the bottom of the chamber 5a, so as to position the container 7 relative to the chamber microwave supply 12.

FIG. 2 shows in cross-sectional form a microwave heating apparatus according to the second embodiment of the invention.

FIG. 3 is a vertical section of the apparatus of FIG. 2,

In these drawings, the same references for designating the components of the apparatus are used as in FIG. 1.

Thus, the apparatus of FIGS. 2 and 3 comprises a tight enclosure 1, such as a shielded enclosure or a glove box, equipped with a biological protection wall 3, a waveguide chamber 5 made from an electricity conducting material located in the enclosure 1 and a container 7 containing the product to be heated positioned in a cavity 50 of the chamber 5.

The microwave generator 9 is located outside the enclosure 1 and supplies the waveguide chamber 5 by means of a coaxial cable 21, which traverses the biological protection wall 3 by an opening 13 and enters the chamber 5 at 12. The waveguide chamber 5 comprises a tight compartment 51 in which circulates a fluid, e.g. water, for absorbing energy losses.

The distance between the centre 52 of the cavity 50 of the waveguide chamber and the end 12 of the coaxial cable is proportional to $\lambda/2$, $\lambda$ being the wavelength of the microwaves. The length of the coaxial cable between its two ends 12 and 53 is proportional to $\lambda$.

Bearing in mind the small cross-section of the passage opening 13 in the biological protection wall 3 of e.g. 10 mm, the biological protection wedge 15 located outside the enclosure and at the passage opening is optional.

FIG. 3 shows that the reception cavity 50 of the container 7 is extended on either side of the waveguide 5 and that it is provided with a detachable base 5a, a gas extraction duct 5b and a height-regularable support 19 for the container 7, as in FIG. 1.

In the two embodiments described here, the container 7 can be of different types. It can in particular be constituted by a tight cylinder, optionally provided with gas discharge means 18. The container is made from a material which does not conduct electricity, e.g. from a plastics material such as polytetrafluoroethylene or glass.

The apparatus also has a control case 23 making it possible to regulate the operating conditions (power, time, etc.) of the microwave generator 9.

In the apparatuses described hereinbefore, use is only made of corrosion-resisting materials, such as steel, stainless steel or polytetrafluoroethylene, within the enclosure 1. The biological protection wall 3 can be made from lead or steel and have a thickness below 25 cm. The wedge 15 is preferably made from lead.

The microwave generator 9 can be a conventional power-modulatable generator, e.g. having a maximum power of 300 to 800 watt and able to operate for more than 2 hours.

For performing the process according to the invention in said apparatus, into the container 7 is introduced the desired acid, aqueous solution quantity and the desired quantity of solid waste or product containing plutonium. Good results can be obtained by using quantities such that the waste/solution ratio (in weight/volume) is approximately $\frac{1}{80}$ (1 g of waste for 80 ml of acid solution). The container 7 is then placed in the chamber 5 at the desired height for ensuring that the liquid level is satisfactorily positioned with respect to the waveguide. The microwave generator 9 is then started up by supplying an appropriate power for the desired time for obtaining the complete dissolving and destruction of the waste. The power applied and the treatment time are chosen as a function of the nature of the treated product and the reagent used.

Generally, the power applied is decreased on obtaining the boiling of the solution in order to maintain boiling with a lower power.

Thus, at the end of the operation a plutonium-containing solution is recovered and this can, if necessary, be concentrated and then treated with a view to recovering the plutonium.

The following examples illustrate the performance of the process according to the invention.

EXAMPLE 1

In this example, 1 g of waste coming from contaminated rubber gloves is treated with 80 ml of 12N nitric acid for 16 min, initially using 25% of power of the microwave generator at a frequency of 2.45 GH or 75 W and whilst then maintaining boiling at a 15% power for 3 min and then 20% for 11 min, i.e. power levels of 45 and 60 W. Therefore the total power used is 15.7 W·h.

After 16 min of treatment, there is a virtually complete destruction of the rubber and a 95 to 99% yield or efficiency is obtained. The latter is defined by the ratio $$\frac{\text{destroyed mass}}{\text{initial mass}} \times 100.$$

EXAMPLE 2

In this example treatment takes place of 0.4 g of DOWEX 18-type anionic resin contaminated by plutonium in 32 ml of concentrated sulphuric acid using the same generator as in example 1. After 23 min of microwave exposure, i.e. an energy of 23 W·h, there is a 98% efficiency, i.e. a complete destruction of the resin and the total release of the plutonium.

EXAMPLES 3 TO 7

In these examples treatment takes place of different types of waste using the same microwave generator as in example 1. The treated waste, the reagents used, the treatment conditions and the results obtained appear in the attached Table, which also gives the results obtained in examples 1 and 2. This table makes it clear that the process according to the invention makes it possible to obtain a mineralization of rubber gloves, ion exchange resins, cottons, KLEENEX and other cellulose articles, as well as polymer elements.

It is also suitable for the treatment of liquid products such as tributyl phosphate in dodecane. In this case very good results are obtained in a nitric medium, despite the problem of the immiscibility of the organic waste and the reagent and the solvent evaporation problems at high temperatures.

Thus, the process according to the invention is of great interest for these different waste products.

COMPARATIVE EXAMPLES 8 AND 9

These examples use the same operating procedure as in example 2 for treating the waste appearing in the Table using the reagents and treatment conditions given in the Table. The results obtained also appear in the Table.

The results of examples 8 and 9 demonstrate that the choice of the reaction medium is important, because for anionic resins, it is not possible to bring about mineralization with concentrated nitric acid, whereas a 98% efficiency is obtained with sulphuric acid (example 2). The same applies with respect to the polymer (polyvinyl chloride) in example 9, despite the addition of an oxidizing agent constituted by persulphate, whereas the latter is partly attacked by the sulphuric acid in example 3.

EXAMPLE 10

This example uses the process according to the invention for dissolving $PuO_2$ in an aqueous solution of nitric acid and hydrofluoric acid.

To this end, 1 g of $PuO_2$ is introduced into 20 ml of an aqueous solution with 14 mole/l of $HNO_3$ and 0.05 mole/l of HF, followed by heating the solution to the boiling point using microwaves having a frequency of 2.45 GHz and a power of 50 W for 30 min. This leads to a complete dissolving of the plutonium dioxide.

EXAMPLE 11

The same operating procedure as in example 10 is used for dissolving plutonium dioxide, but use is made of an aqueous solution with 7 mole/l of nitric acid and 0.05 mole/l of hydrofluoric acid. Under these conditions total dissolving is brought about in 1 hour.

COMPARATIVE EXAMPLE 12

This example uses the same operating procedure as in example 10 for dissolving 1 g of $PuO_2$ in 20 ml of a solution with 14 mole/l of $HNO_3$ and 0.05 mole/l of HF, except for using Joule effect heating in place of microwave heating.

Under these conditions the $PuO_2$ is completely dissolved after approximately 3 h.

On comparing examples 10 to 12, it can be seen that as a result of using microwave heating, it is possible to dissolve more rapidly and use a solution having a lower nitric acidity and which is therefore less corrosive.

EXAMPLE 13

In this example 0.2 g of plutonium are dissolved in an aqueous solution with 7 mole/l of nitric acid and 0.05 mole/l of hydrofluoric acid performing the microwave heating for 15 min, at a power of 50 W·h and a frequency of 2.45 GHz. This leads to a complete dissolving of the metal plutonium.

COMPARATIVE EXAMPLE 14

This example follows the conventional operating procedure for dissolving 0.2 g of plutonium using 10 ml of a 3 mole/l hydrobromic acid solution, followed by the elimination of the bromine by distillation and taking up the residue by an aqueous solution of 7 mole/l nitric acid and 0.05 mole/l hydrofluoric acid. Under these conditions, the total treatment time is 2 hours, whereas it is only 15 min in the previous example.

Thus, the use according to the invention of microwave heating makes it possible to improve the radioactive waste treatment processes, as well as the processes for dissolving plutonium from plutonium dioxide or metallic plutonium.

a) introducing the solid or liquid products into an aqueous, acid solution that is free of acids containing more than one fluorine moiety per molecule, said products comprising organic or mineral waste materials contaminated by plutonium, metallic plutonium or plutonium oxide with said solid products including plutonium or plutonium dioxide, and b) microwave heating the aqueous, acid solution containing these products at a temperature and for a time adequate for destroying the solid products and for dissolving the plutonium and/or radioactive elements in the aqueous solution, said aqueous solution being a solution containing 5 to 14 mole/l $HNO_3$ and 0.01 to 0.1 mole/l of HF.

2. Process for the treatment of waste products containing plutonium and/or other radioactive elemental, comprising the steps of:

a) introducing the waste products into an aqueous, acid solution that is free of acids containing more than one fluorine moiety per molecule, said waste products being contaminated by plutonium, metallic plutonium or plutonium oxide, said waste products including at least one contaminated organic solvent, and b) microwave heating the aqueous, acid solution containing these products at a temperature and for a time adequate for destroying the waste products and for dissolving the plutonium and/or radioactive elements in the aqueous solution.

TABLE

| EX | WASTE | SOURCE | QUANTITY INTRODUCED | REACTION MEDIUM | % Yield | Time in min | Energy Supplied |
|----|-------|--------|---------------------|-----------------|---------|-------------|-----------------|
| 1 | Rubber | Pregloves | 1 g | 80 ml of 12N $HNO_3$ | 95–99 | 16 min | 16 W.H |
| 2 | Anionic resin | DOWEX 1*8 | 0.4 g | 32 ml of conc. $H_2SO_4$ | 98% | 23 min | 23 W.H |
| 3 | Polymer | 18 ml jugs | 1 g | 80 ml of conc. $H_2SO_4$ | 30–40 | 28 min | 24 W.H |
| 4 | Cellulose | KLEENEX | 1 g | 80 ml of 12N $HNO_3$ | 100% | 10 min | 10 W.H |
| 5 | Cotton | DECONTAMINATION | 0.6 g | 48 ml of 12N $HNO_3$ | 100% | 18 min | 16 W.H |
| 6 | Solvent | TBP/DODECANE | 1 ml | 80 ml of 12N $HNO_3$ | 60–90 | 42 min | 36 W.H |
| 7 | Rubber | VENITEX gloves | 1 g | 80 ml of 12N $HNO_3$ | 95–99 | 30 min | 28 W.H |
| 8 | Anionic resin | DOWEX 1*8 | 0.2 g | 16 ml of 12N $HNO_3$ | 0 | 22 min | 17 W.H |
| 9 | Polymer | 18 ml jugs | 0.5 g | 40 ml of $S_2O_8$—$HNO_3$ | 0 | 30 min | 32 W.H |

We claim:

1. Process for the treatment of solid products or liquid products containing plutonium and/or other radioactive elements, comprising the steps of:

3. Process according to claim 2, wherein the aqueous solution is a nitric acid solution.

* * * * *